United States Patent Office 3,133,923
Patented May 19, 1964

---

3,133,923
2,4,7-TRIAMINO-6-(2-BENZIMIDAZOLYL)-
PTERIDINE
Thomas S. Osdene, West Chester, Pa., assignor to American Home Products Corporation, New York, N.Y., a corporation of Delaware
No Drawing. Filed Jan. 10, 1963, Ser. No. 250,473
1 Claim. (Cl. 260—251.5)

This invention relates to a novel compound having activity against Sarcoma 180 tumors as determined on mice by experimental test procedures.

More specifically, this invention relates to 2,4,7-triamino-6-(2-benzimidazolyl)pteridine and to a process for producing this compound by reacting 2,4,6-triamino-5-nitrosopyrimidine with 2-(cyanomethyl)benzimidazole.

The novel compound made available by the present invention has the following structural formula:

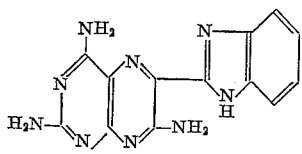

This compound is normally isolated in the form of its monohydrate, which has the empirical formula $$C_{13}H_{11}N_9 \cdot H_2O$$

and melts above 360° C. It is insoluble in water but soluble in aqueous dimethylformamide.

The compound of this invention is prepared most advantageously by heating together in an anhydrous neutral polar solvent in the presence of a catalytic amount of a basic catalyst, 2,4,6-triamino-5-nitrosopyrimidine with 2-(cyanomethyl)benzimidazole.

Neutral polar solvents useful in the synthesis of the instant compound are methanol, propanol, ethanol, butanol, glycol ethers such as 2-methoxyethanol, 2-ethoxyethanol, methoxy and ethoxy propanols and amides such as dimethylformamide, diethylformamide and dimethylacetamide. Suitable basic catalysts for promoting the reaction include the alkali metals, their alkoxides and their alkoxy alkoxides. Preferred among these are sodium and sodium alpha-ethoxy ethoxide. The reaction temperatures range from about 60° to 200° C. and the reaction is preferably conducted at or near the boiling point of the selected solvent and under autogenous pressure. The final product is purified preferably by dissolving it in dimethylformamide and by precipitating it with the addition of water.

The following example in which all temperatures are in degrees centrigrade illustrates the best mode of carrying out the invention:

To a solution of 0.2 g. of sodium in 250 ml. of dried 2-ethoxyethanol was added 3.08 g. of 2,4,6-triamino-5-nitrosopyrimidine. The mixture was stirred and brought to its boiling point, 3.3 g. of 2-(cyanomethyl)-benzimidazole was added, and the mixture was boiled under reflux for 2 hours. A fine yellow precipitate deposited during this time. After allowing the reaction mixture to cool, the precipitate was removed by filtration. Several recrystallizations from aqueous dimethylformamide afforded 2,4,7-triamino - 6 - (2 - benzimidazolyl)pteridine monohydrate, M.P.>360°.

*Analysis.*—Calculated: C=50.15; H=4.21; N=40.50. Found: C=50.72; H=4.26; N=40.40.

Unexpectedly, in view of the altogether different types of pharmacological activities exhibited by cognate compounds, the compound of this invention is successful in arresting the growth of Sarcoma 180 tumors in mice. This finding was made by testing the compound according to Procedure NSC D–52058, given in the monogram: "Specifications for Screening Chemical Agents and Natural Materials against Animal Tumors," published by the Cancer Chemotherapy National Service Center, National Institutes of Health, Bethesda, Maryland.

Briefly summarized, this test procedure consists in implanting Sarcoma 180 tumors in mice and in comparing the weights of the tumors (T) in mice to which the present compound had been administered intraperitoneally, with the weight of the tumors in the control (C) mice. This was done with three sets of mice.

For a compound to be considered active against Sarcoma 180, according to this Procedure, the product $T/C_1 \times T/C_2 \times T/C_3$ must not exceed 0.08. The value of 0.01 obtained with the present compound therefore evidences its strong activity against Sarcoma 180. The data giving rise to the above observation are tabulated below:

[NSC D–52058. S–180]

| Dosage, mg./kg. | Dead—Total | $T/C_1$ | $T/C_2$ | $T/C_1 \times T/C_2$ | $T/C_3$ | $T/C_1 \times T/C_2 \times T/C_3$ |
|---|---|---|---|---|---|---|
| 375 | 2/6 | 0.34 | | | | |
| 375 | 2/6 | | 0.05 | 0.017 | | |
| 375 | 1/6 | | | | 0.58 | 0.01 |

What is claimed is:
2,4,7-triamino-6-(2-benzimidazolyl)pteridine.

References Cited in the file of this patent
Spickett et. al.: J. Chem. Soc., London (1954), pages 2887–95, QD 1.C6.